United States Patent [19]

Etzold et al.

[11] 4,295,557

[45] Oct. 20, 1981

[54] APPARATUS AND METHOD FOR ALIGNING ELONGATED LIGNO-CELLULOSIC STRANDS INTO PARALLELISM

[75] Inventors: Roland Etzold, Mountain View, Calif.; Julius S. Impellizzeri, New York, N.Y.; Thomas W. Vaughan, Mountain View, Calif.

[73] Assignee: Elmendorf Research, Inc., Palo Alto, Calif.

[21] Appl. No.: 778,412

[22] Filed: Mar. 17, 1977

[51] Int. Cl.[3] .............................................. B65G 47/14

[52] U.S. Cl. .................................. 198/382; 29/403.1; 29/809; 425/83.1; 425/110

[58] Field of Search ............... 198/382, 446, 383, 390, 198/394, 400, 416, 773, 774, 775, 776, 445; 193/45, 48; 425/81, 83, 110, 81.1, 83.1; 29/211 C, 211 L, 419 R, 909, 403.1

[56] References Cited

U.S. PATENT DOCUMENTS 3,708,053 1/1973 Anderson ........................... 198/445

4,058,201 11/1977 Etzold ................................ 198/382

FOREIGN PATENT DOCUMENTS 816285 7/1959 United Kingdom ................ 198/382

*Primary Examiner*—Robert B. Reeves

*Assistant Examiner*—Douglas D. Watts

*Attorney, Agent, or Firm*—John L. McGannon

[57] ABSTRACT

Wood strands are oriented into parallelism with the aid of a number of adjacent, generally parallel spaces defined by relatively thin, elongated guide members having flat sides with the longitudinal axes of the guide members extending substantially parallel to a support surface below the spaces for receiving the parallel, oriented wood strands. Each pair of adjacent guide members are moved in opposite directions to turn strands which span the guide members until the strand falls into the space therebetween. In one form of the invention, certain of the guide members have yielding projections on their upper margins and the other guide members have positive projections on their upper margins, each yielding projection having a pair of inclined end edges and each positive projection having end edges generally perpendicular to the longitudinal axis of the corresponding guide member. In another form of the invention, each guide member has spaced, yielding and positive projections with a positive projection being between each pair of adjacent yielding projections, respectively. In both forms of the invention, the yielding projections serve to raise wood strands which span the distance between three or more guide members; whereas, the positive projections operate to turn the strands until they fall between the guide members.

6 Claims, 4 Drawing Figures

(OLD ART)

APPARATUS AND METHOD FOR ALIGNING ELONGATED LIGNO-CELLULOSIC STRANDS INTO PARALLELISM

This invention relates to a method and apparatus for orienting binder-coated wood strands into parallelism so that they can fall onto a moving support in the process of making a board. In particular, the invention pertains to orienting wood strands of different lengths without reducing the degree of orientation of relatively short strands and without causing breakage of relatively long strands while, at the same time, maintaining a high volume through-put.

BACKGROUND OF THE INVENTION

A method and apparatus for orienting binder-coated wood strands into parallelism has been described in pending U.S. application Ser. No. 535,079, filed Dec. 20, 1974 now U.S. Pat. No. 4,058,201. As described in this application, wood strands may be felted in a number of layers with the orientation of adjacent strand layers being generally perpendicular to each other. Thus, after compressing the mat of strand layers and curing the binder on the wood strands, a board is produced which has superior structural properties. Such a product is of the type described in U.S. Pat. No. 3,164,511.

U.S. application Ser. No. 535,079 further describes an apparatus comprised of a plurality of elongated, parallel, relatively thin plate-like strand guide members positioned above a moving support. The longitudinal axes of the guide members extend substantially parallel to the surface of the support, and the widths or the short axes of the guide members are substantially perpendicular to the surface of the support. The distance from one guide member to the next adjacent guide member is less than the lengths of the majority of the wood strands.

During operation of the apparatus, adjacent guide members move in opposite directions with respect to each other and in the general direction of their longitudinal axes. As the guide members move, wood strands are caused to gravitate from above the guide members. Moreover, each guide member has spaced projections on its upper margin which operate to turn those strands which, instead of immediately passing through the spaces between the guide members, are intercepted and span the distance between two or more guide members, such turning action continuing until the strands fall into the spaces between the guide members and onto the moving support therebelow. Using this method and apparatus, strands may be oriented parallel to the direction of movement of the support and perpendicular to the direction of such movement, depending upon the positions of the guide members relative to the direction of support movement.

The technology in the industry is available to produce wood strands of generally uniform length. Such strands can be oriented into parallelism at a high through-put rate with apparatus of the type described in U.S. application Ser. No. 535,079 using projections of the type described above on the upper margins of the guide members and with a spacing between each pair of adjacent guide members selected to accommodate strands of this uniform length. It is recognized, however, that to produce strands of uniform length would be costly and would not be economical for mass production of oriented strand boards.

If all wood strands were of relatively uniform length, the distance between the guide members could be a little less than one-half the maximum strand length to assure proper orientation. If the guide members used for orientation have upper marginal projections with generally vertical end edges, the apparatus would then achieve a relatively high through-put and the strands would not bend or break. If the distance between the guide members is considerably smaller than one-half the maximum strand length and such projections with vertical end edges are used, then the longer strands would span three or more guide members and be engaged by three or more such projections on the corresponding three or more guide members at the same time. This would result in a number of broken or bent strands and this number would increase with an increase in strand length or decrease in the distance between the adjacent guide members.

In view of the foregoing problems, a need has arisen to provide apparatus and method to orient wood strands having different, non-uniform lengths which are felted onto moving guide members simultaneously. The objective is to accommodate such wood strands of different lengths without breaking or bending the long strands yet still permitting the alignment of the short strands into parallelism while maintaining a relatively high through-put.

SUMMARY OF THE INVENTION

The present invention satisfies the foregoing need by providing apparatus and method in which spaced movable guide members are provided with upper marginal projections in specific shapes which operate to permit turning of the wood strands in the plane of the upper margins of the guide members and also allow raising of the wood strands when their lengths exceed a minimum value. In this way, both relatively long strands and relatively short strands can be accommodated simultaneously to produce a relatively high through-put and without causing breakage or bending of the long strands which would otherwise result in a structurally weaker board after the strands have been deposited on the moving support beneath the guide members.

To this end, the guide members have both positive projections, i.e., projections having end edges generally perpendicular to the longitudinal axes of respective guide members and in the planes of such guide members, and yielding projections, i.e., projections have inclined end edges in the planes of respective guide members. The positive projections, when engaging wood strands, perform a turning of the strands on the upper margins of corresponding guide members since the end edges of the positive projections present abutments which prevent relative movements between the strands and the end edges. The yielding projections permit such relative movement by allowing a raising or tilting of the strands as they move along the inclined end edges of the yielding projections, thereby permitting some strands to sometimes slide over the yielding projections for a distance sufficient to cause the longitudinal axes of the strands to become aligned with the spaces between adjacent guide members.

The use of positive projections results in a very high strand through-put for the apparatus which is essential for industrial production. The yielding projections are more gentle to the strands than positive projections, yet use of only yielding projections reduces the strand through-put from that provided by the positive strands.

This reduction in through-put arises because the yielding projections permit the wood strands to slide over the tops of the yielding projections and is particularly severe with long strands or short distances between guide members. Tests have shown that a high through-put can be maintained by using a proper combination of yielding projections and positive projections which together effectively manipulate long strands spanning many guide members by turning these strands until they fall into the spaces between the guide members without breaking. In addition to a proper combination and placement of yielding and positive projections, the apparatus of the present invention provides a proper relationship between the maximum length of the strands, the spacing between adjacent guide members, and the distance between projections along the upper marginal edge of each guide member as well as the minimum displacement or stroke of the two sets of guide members.

For purposes of illustration, the apparatus of the present invention has two sets of guide members, each pair of adjacent guide members being in different sets regardless of whether continuously moving guide members, such as endless belts or oscillating guide members, are used. To avoid the breakage of wood strands, the first set of guide members can be equipped with yielding projections and the second set of guide members can be provided with positive projections. This will, however, never permit two positive projections to engage a given strand from different directions and results in a modest strand through-put.

The primary object of this invention is to provide an improved apparatus and method for orienting wood strands into parallelism by the use of elongated guide members formed by generally parallel, reciprocating plates or generally parallel segments of a continuously moving endless flexible belt, wherein the guide members have spaced projections on their upper margins with some of the projections having end edges generally perpendicular to the longitudinal axes of respective guide members and other projections having inclined end edges to permit not only turning of wood strands spanning two or more guide members but also raising or tilting of the strands over projections to avoid breakage or bending of the wood strands while the wood strands are being moved into parallelism with the spaces between the guide members, thereby permitting the wood strands to gravitate through such spaces and onto a moving support below the guide members.

Another object of this invention is to provide an apparatus and method of the type described wherein each guide member has both positive and yielding projections with a positive projection between each pair of yielding projections, respectively, to accommodate wood strands having a relatively wide range of lengths without sacrificing a relatively high strand through-put for the apparatus.

Other objects of this invention will become apparent as the following specification progresses, reference being had to the accompanying drawings for an illustration of several embodiments of the apparatus.

IN THE DRAWINGS

Figure 1:
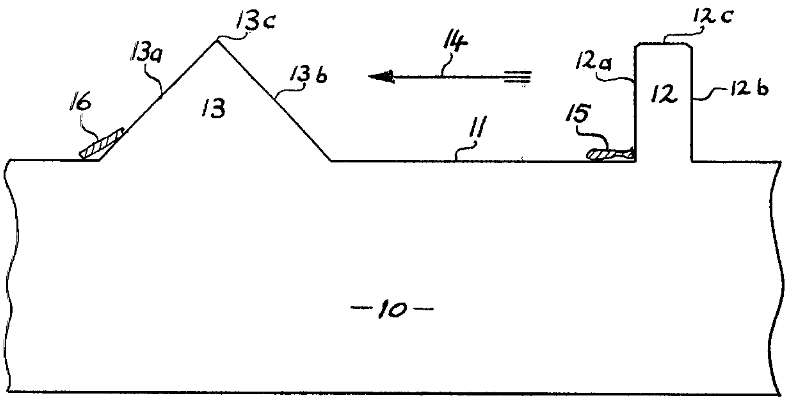
FIG. 1 is a side elevational view of a portion of a guide member in the form of a rigid plate, showing a positive projection, a yielding projection, and wood strands engaged by the projections.

FIG. 1 which is approximately drawn to full scale, shows a side view of one of an elongated guide member 10 typical of one embodiment of the guide members of this invention. The guide member can be a rigid, thin plate, a segment of an endless, flexible belt, or one of a pair of segments of a flexible belt having a pair of reciprocal ends adjacent to each other.

Guide member 10 has, on its upper marginal edge 11, a positive projection 12 and a yielding projection 13 in spaced apart relationship. The projections are integral with guide member 10 or otherwise secured to upper edge 11 and the projections are in the plane of the guide member. Positive projection 12 has end edges **12*a* and 12*b* which are generally perpendicular to upper edge 11 and terminate at a top edge 12*c*. Projection 13 has inclined end edges 13*a* and 13*b* which terminate at a point 13*c*. For purposes of illustration, the heights of projections 12 and 13** are the same.

FIG. 1 further shows an end view of a wood strand 15 which is supported on edge 11 of guide member 10 and is engaged by end edge **12*a* of projection 12. Thus, strand 15 will positively move to the left when viewing FIG. 1, when guide member 10 moves in the direction of arrow 14.**

An end view of another wood strand 16 is shown in engagement with inclined end edge **13*a* of projection 13 and the inclination of such edge allows strand 16 to slide up the edge and over top point 13*c*, thereby tilting or raising the wood strand for a reason hereinafter described. Thus, projection 12 engages one part of strand 15 positively so that there can be no relative movement between such strand part and projection 12, and this strand part must move with projection 12. Projection 13 may move the part of strand 16 engaged by it; however, if other parts of strand 16 are engaged by other projections on adjacent guide members, then strand 16 will slide upwardly along inclined edge 13*a* and will be tilted with respect to such other guide members. If resistance to movement of strand 16 caused by the other projections continues, strand 16 will slip over top point 13*c* of projection 13 and then down along edge 13*b*, thereby causing a turning of strand 16.**

The internal angle (FIG. 1) between edge **13*a* and the extension of upper edge 11 should be large enough to permit wood strands to be moved which are pushed relatively lightly against projection 13, but should be small enough to permit strands which are pushed relatively forcefully against this projection to move relative to and to slide upwardly on edge 13*a*** before breaking. While this angle may vary with other dimensions of the apparatus and particularly with the geometry of the strands, an angle of about 45° is typical.

Figure 2:
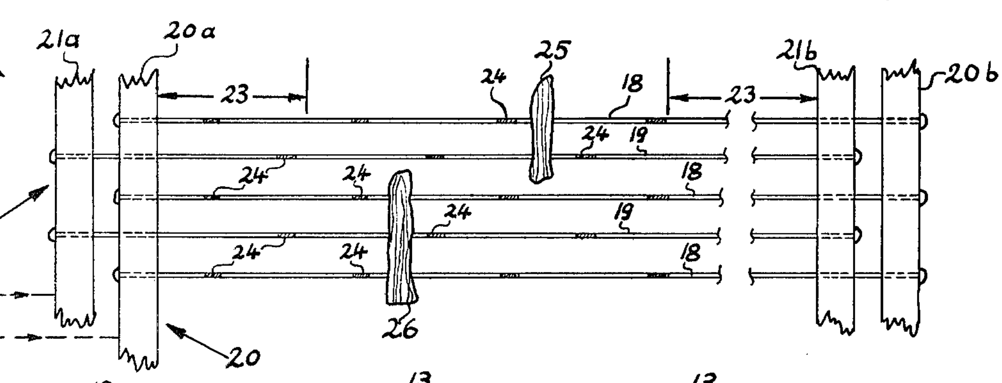
FIG. 2 is a top plan view of a number of strand guide members equipped only with positive projections as appear in prior art structures.

In the prior art apparatus 17 shown in FIG. 2, two sets of guide members are provided, one set being formed of guide members 18 and the other set being formed with guide members 19. Guide members 18 are coupled to a frame 20 having end parts **20*a* and 20*b*; and guide members 19 are coupled to a frame 21 having end parts 21***a* and 21*b*. A drive means 22 for reciprocating frames 20 and 21 is coupled to the two frames so that, as frame 20 moves to the left, for instance, when viewing FIG. 2, frame 21 moves to the right and vice versa. The full stroke of the two frames combined is twice the distance denoted by the numeral 23. Thus, each guide member reciprocates and moves in a direction opposite to the direction of movement of the next adjacent guide member when drive means 22 is actuated.

Guide members 18 and 19 of prior art apparatus 17 are provided with respective, spaced projections 24. These projections are identical in shape to positive projections 12 of the present invention.

A relatively short wood strand 25 spanning two adjacent guide members 18 and 19 will be engaged by projections 24 on these guide members until the strand is rotated and falls into the space between the guide members. An only somewhat longer wood strand 26 spanning three guide members will be engaged by projections 24 on the latter. If this strand were only a little longer than two times the distance between a pair of adjacent guide members and were somewhat flexible, it would flex while being rotated by the projections until it would be able to fall between two of the three guide members. However, if it is stiff or, as shown, considerably longer than twice the distance between a pair of adjacent guide members 18 and 19, it will either be broken into two pieces or partly broken and bent before falling into the space between a pair of guide members. Since broken and partly broken strands reduce the strength of the resulting board produced with aligned wood strands and also result in a less evenly felted mat, and since an occasional splinter when caught between three positive projections 24 might bend these projections, the arrangement of projections as shown in FIG. 2 should be used only for a strand mix in which the wood strands are quite uniform in length and where the maximum length of each strand is not much longer than twice the distance between a pair of adjacent guide members.

It is, of course, possible to offset projections 24 on each guide member from those of adjacent guide members of the same set and to extend the distance between a pair of adjacent projections on each guide member. By doing so, it would be possible to orient somewhat longer strands without breaking them. However, this would reduce the number of projections on each guide member and thereby decrease the strand through-put of apparatus 17. It would also increase the required stroke of the guide members of the two sets, since the total displacement between a pair of adjacent guide members should be slightly more than twice the distance between adjacent projections on a guide member to avoid accumulation of strands on the upper edges of the guide members. An increase in the stroke of the guide members would make the apparatus more complicated and costly and would also increase the requirement for operating space.

Figure 3:
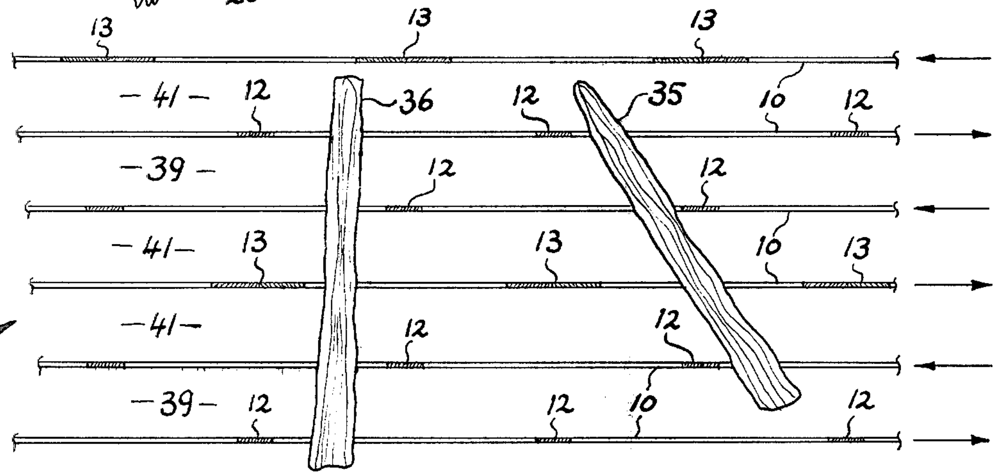
FIG. 3 is a view similar to FIG. 2 but showing a number of strand guide members having positive projections and other guide members having yielding projections and FIG. 4 is a view similar to FIG. 3 but showing another form of the apparatus of this invention with a different arrangement of positive and yielding projections.

One embodiment of the apparatus of this invention denoted by the numeral 27 is shown fragmentarily in FIG. 3 and includes two sets of guide members 10. The guide members are coupled to respective motor-driven frames (not shown) of the type described above with respect to prior art apparatus 17 of FIG. 2. Thus, when one set of guide members is moved in one direction, the other set of guide members is moved in the opposite direction. A guide member of one set is directly adjacent to a guide member of the other set and the guide members, as illustrated, are generally plate-like members arranged in vertical planes.

As shown in FIG. 3, every third guide member 10 has only yielding projections thereon and the other two guide members of each group of three have only positive projections 12. This arrangement permits orientation of relatively long strands without breakage, while at the same time, having the spacing between each pair of guide members sufficiently small to orient relatively short strands properly. A strand 35 spanning four guide members or a strand 36 spanning five guide members will not break when engaged by three or more positive projections 12 moving with their respective guide members since the adjacent projections 13 will raise or lift one part of the strand above the height of the positive projections while another part of the strand remains engaged by two corresponding positive projections 12. This results in turning of the strand without breakage.

The arrangement of FIG. 3 has, however, a limitation on its use. Tests have shown that spaces 39 between two adjacent guide members 10 with positive projections 12 receive more strands than those spaces 41 which have a guide member with positive projections 12 on one side of the space and a guide member with yielding projections 13 on the other side of the space. Thus, this arrangement can be best used for cross orientation, that is, orientation of the strands so that their longitudinal axes are perpendicular to the movement of the support below the guide members. If this arrangement should be used for parallel orientation, that is orientation of the strands parallel to support movement, the resultant strand mat on the support could, in some cases, be uneven in thickness.

Figure 4:
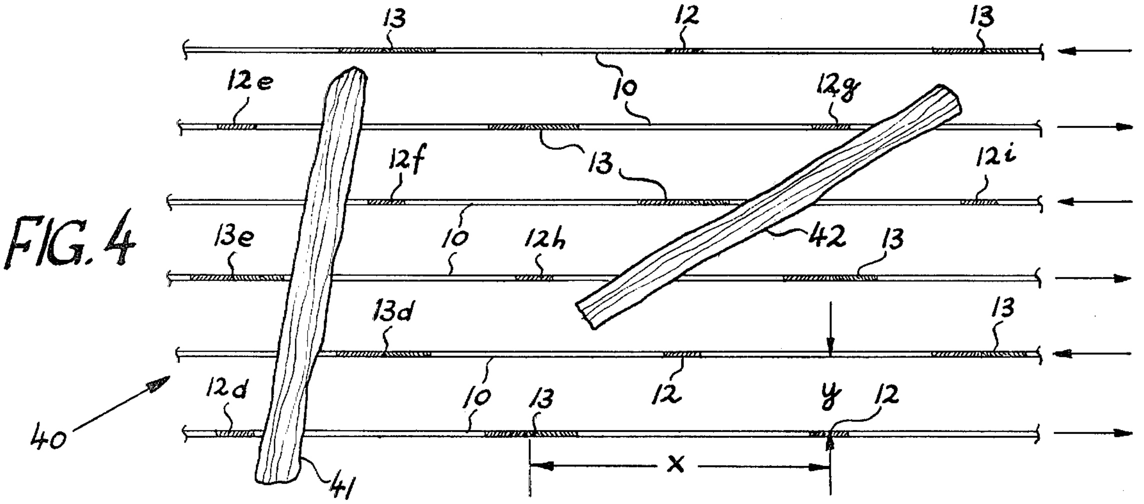

A preferred embodiment of the improved apparatus of this invention is denoted by the numeral 40 and is shown in FIG. 4. It includes two sets of guide members 10. One set of guide members is coupled to a first frame (not shown) and the other set of guide members is coupled to a second frame (not shown) with the frames being coupled to a motor and reciprocated in opposite directions relative to each other. These frames are similar to frames 20 and 21 of FIG. 2. Each guide member 10 has both yielding projections 13 and positive projections 12 on it, there being a positive projection between each pair of adjacent yielding projections. Thus, all guide members have the same number and distribution of yielding and positive projections and all spaces between the guide members will receive the same amount of strands, resulting in a uniformily felted mat. As shown in FIG. 4, the pattern of projections on each set of guide members transversely of their longitudinal axes provides a positive projection on one guide member, a yielding projection on the next guide member of the same set, a positive projection on the next guide member of the same set and so forth.

The projections on the guide members of apparatus 40 permit both turning and raising of the wood strands. While an apparatus with all positive projections will turn spanning strands in only a horizontal plane, and an apparatus with all yielding projections can raise strands spanning several guide members near both ends so that they are also substantially in a horizontal plane, the combination of yielding and positive projections and their proper arrangements on the guide members results in tilting the strands relative to the upper edges of the guide members and turning the strands by positive projections engaging first parts of the strands while second parts of the strands are lifted above the top of the other positive projections which would otherwise tend to break the strands. Thus, a strand spanning three or more guide members is moved in two dimensions in a horizontal plane and may be moved in a third dimension in a vertical plane when the guide members reciprocate.

As an example, strand 41 is shown in FIG. 4 in such a position. The yielding projections 13*d* and 13*e* will lift the end of this strand above the height of positive projection 12*d*, while the two other positive projections 12*e* and 12*f* will turn the strand over the yielding projection 13*e* and cause it to fall into a space between corresponding guide members without breaking. In this manner, strands, such as strand 41 spanning five or more guide members, can be oriented at a high through-put rate without breaking.

The maximum length of the strands being oriented with this apparatus depends on distance X (FIG. 4) from one yielding projection to the next adjacent positive projection on the same guide member, and on the distance Y between adjacent guide members. For instance, strand 42 is in the position determining the maximum length of the strands based on dimensions X and Y. Positive projections 12*g*, 12*h* and 12*i* could break the strand when moving with their respective guide members. Therefore, the maximum length should be $\sqrt{X^2 + (2Y)^2}$. In fact, it can be a little longer than that due to the elastic flexing of wood strands which will allow bending of the strands and thereby shorten the effective or actual length of the strand contacting the projections. Typically, this shortening would be about ¼-inch. The distance Y is important for the orientation of short strands and should be selected to accommodate these strands. The maximum strand length is selected, on the basis of the raw material being used, the flaking process, and the desired properties of the board. The distance X is variable and can be changed to accommodate the distance Y and maximum strand length. The total throw or stroke, i.e., the combined stroke of the two guide member sets, must accommodate the distance X and should be somewhat more than twice that distance.

This method allows the design of an apparatus which will be able to orient strands of lengths over a relatively wide range. Obviously, many other combinations of yielding and positive projections can be selected which are included in the scope of the present invention so long as this combination turns wood strands not only in the two dimensions of the horizontal plane or the plane of the upper marginal edges of the guide members, but also lifts the strands in the third dimension, in a vertical plane or inclined plane.

While it is believed that this invention has been thoroughly described in the foregoing, the following three examples are added to illustrate further this method and apparatus.

EXAMPLE I

A certain raw material, and the machine and method used in cutting this raw material into strands, results in 50% of the total strand volume having an average of about one-half the maximum strand length which was selected to be 2½ inches long. Using the system shown in FIG. 2, the gap between guide members should be about 1⅛ inches to avoid breakage of the long strands. This would mean that the short strands which are half of the total material will be poorly oriented or not oriented at all, only strands ranging from about 1½" to 2½" will be well oriented.

The same strands used in a system as shown in FIG. 4 with a narrow gap of ½-inch between guide members will result in good orientation of the short strands. To accommodate the maximum length of the strands, which is 2½ inches, the distance X must then be about $\sqrt{(2\frac{1}{4})^2 - 1}$, allowing for ¼-inch reduction in effective length of the strand due to bending. This distance X is only a little more than 2 inches, and the total throw between both guide member sets could be as low as 4½ inches. The resultant machine requires a relatively short total throw, has a short distance between projections, and is able to orient strands with a length from about ¾-inch to 2½ inches without breaking the long strands while still orienting the short strands adequately and while maintaining a high strand through-put.

EXAMPLE II

Strands are cut in a ring flaker from wood chips about 3 to 4 inches in length. This allows the use of waste raw material such as sawmill slabs, edgings, tree tops and branches, which cannot successfully be cut into strands with a drum or disc flaker. This method of strand production is important from the point of total wood utilization, but the resultant strands vary substantially in length. While the maximum length is about 3½ inches, a large percentage are in the range of ¾" to 1½", which requires a ½-inch gap between guide members. The yielding as well as the positive projections of those guide members have been selected to be 1-inch high. According to the system shown in FIG. 4, the distance X must be $\sqrt{(3\frac{1}{4})^2 - 1}$, or a little more than 3 inches, assuming a ¼-inch reduction in strand length due to bending. This requires only a 6½ inches total throw of the guide member sets. Even though the long strands may span seven to eight guide members, they will not be broken, while the short strands will be well oriented, resulting in boards with high structural values. The through-put will be high and the total throw of adjacent guide members relatively small, which simplifies the machine and reduces space requirements.

EXAMPLE III

Ordinary particleboard furnish, such as waste planer shavings, which have been refined with a ring flaker, may range from dust size particles to ¾-inch length. Such a material, when oriented, will not result in a board comparable in physical properties to an oriented stand board or to softwood plywood. However, orientation will improve the strength and the stiffness of such a board to an appreciable degree, without additional cost in raw materials.

A system as shown in FIG. 4 will be used with the distance between guide members of 3/16-inch. This will still not align all small particles which are shorter than the distance from guide member to guide member, but a large number of them will be aligned due to the rapid movement of the guide members, which are very close together, resulting in a combing effect of the longer as well as shorter material while it is falling in a continuous stream toward the moving support.

The guide members are ¾-inch in height and have positive and yielding projections on their upper margins, as shown in FIG. 4. The distance from the center of one projection to the center of the next projection is 1 inch. The height of the projections is ⅜ of an inch. The width of the positive projections is ¼ of an inch and the yielding projections have a 45° angle between the sloped edge of the projection and the base line of the projection. The total throw between both guide member sets is $2\frac{1}{2}$ inches.

We claim:

1. Apparatus for orienting wood strands into parallelism comprising: a group of elongated spaced, generally parallel guide members presenting open top spaces therebetween and defining the side boundaries for the spaces; means coupled with the guide members for moving each pair of adjacent guide members in opposite directions relative to each other and longitudinally of the spaces, said group having spaced first and second projections thereon, each first projection having an end edge extending upwardly from and substantially perpendicular to the upper margin of a corresponding guide member, each second projection having an inclined edge extending upwardly from the upper margin of a corresponding guide member, the end edge of each first projection being operable to engage and move a wood strand in the direction of movement of the corresponding guide member, the inclined edge of each second projection defining an inclined path permitting one part of a wood strand to be raised with respect to the corresponding guide member as a function of the movement of the latter when projections of other guide members engage other parts of the wood strand, whereby strands spanning more than two guide members can be tilted, turned and moved into alignment with adjacent spaces without damage to the wood strands.

2. Apparatus as set forth in claim 1, wherein certain of the guide members have only second projections thereon, the pairs of guide members on each side, respectively, of those guide members with second projections having only first projections thereon.

3. Apparatus as set forth in claim 1, wherein each guide member has first and second projections thereon, there being a second projection between each pair of first projections, respectively.

4. Apparatus as set forth in claim 1, wherein said moving means is operable to reciprocate each guide member.

5. Apparatus as set forth in claim 3, wherein is included two sets of guide members, a guide member of one set being between a pair of guide members of the other set, respectively, a first projection on one guide member being aligned with a second projection on the next adjacent guide member of the same set in a direction perpendicular to the direction of movement of the guide members.

6. Apparatus as set forth in claim 3, wherein the maximum length of the strands is substantially equal to $$\sqrt{X^2 + (2Y)^2}$$

where: X is the distance between each first projection and the next adjacent second projection on the same guide member, and Y is the distance between each pair of adjacent guide members.

* * * * *